United States Patent [19]
Mayer

[11] 3,997,869
[45] Dec. 14, 1976

[54] SPEED LIMIT PASSING INDICATOR
[76] Inventor: Ferdy Mayer, 18, rue Thiers, 38000 Grenoble, France
[22] Filed: May 19, 1975
[21] Appl. No.: 578,958
[30] Foreign Application Priority Data
    May 17, 1974 France .................. 74.17240
[52] U.S. Cl. .................. 340/62; 340/263; 328/140; 307/10 R; 180/106
[51] Int. Cl.² .................. B60Q 1/54
[58] Field of Search .......... 340/53, 62, 263; 307/9, 307/10 R, 120; 180/98, 105 R, 105 E, 106; 328/132, 140, 141

[56] References Cited
UNITED STATES PATENTS
3,597,730   8/1971   McClellan, Sr. et al. .......... 340/62
3,794,972   2/1974   Van Ostrom .................. 340/62

*Primary Examiner*—Alvin H. Waring
*Attorney, Agent, or Firm*—Sughrue, Rothwell, Mion, Zinn & Macpeak

[57] ABSTRACT

A speed limit system providing a passing of a given limit is disclosed. The speed-limit indicator comprises a frequency-voltage converter receiving at its input a signal which is produced by a sensor indicative of vehicle speed. A detection circuit comprising a frequency-voltage converter and a comparator followed by a gate circuit and signaling means are provided. The comparator utilizes the output of the voltage from the converter and a reference voltage which represents the speed limit. The gate circuit is interposed between the output of the comparator and the signaling means. A control signal is provided to the gate circuit, and in accordance with the state of that control signal, the gate circuit transmits or blocks the output signal of the comparator to the signaling means.

13 Claims, 7 Drawing Figures

SPEED LIMIT PASSING INDICATOR

BACKGROUND OF THE INVENTION

1. Field of the Invention

The present invention relates to the control of the speed of a vehicle.

2. Description of the Prior Art

With the generalization of speed limits on the highway network it has become clear that compliance with these limits requires on the part of the driver of a vehicle a frequent reading of his speedometer which dangerously diverts his attention from the road.

Various apparatus have been proposed to indicate to the driver the passing or exceeding of an arbitrary speed without requiring him to take his eyes off the road, by light, for example, an automatic action on the accelerator control or sound or signals. These apparatus are, however, not very convenient since they require a continual setting of the arbitrary speed in accordance with the speed limits encountered on the route and, moreover, they come into action in an excessively systematic manner, even for example in the case of passing the speed limit for a short period for overtaking.

SUMMARY OF THE INVENTION

An object of the present invention is to avoid these drawbacks. Another object is to provide a speed limit indicator which is cheap and which, in addition to its signalling function, is capable of controlling various operations concerning the driving of a vehicle relating to its speed, as for example the locking of the doors, the actuation of parts such as the fuel injection pump, the automatic cutting off of the starter, the automatic speed change, etc.

According to the invention there is provided a speed limit indicator comprising a frequency-voltage converter receiving at its input a signal produced by a tachometric sensor and at least one detection circuit comprising a frequency-voltage converter and a comparator followed by a "gate" circuit and signalling means. The comparator receives at its input the output voltage of the converter and a reference voltage which represents a speed limit. The gate circuit is interposed between the output of the comparator and the signalling means. It transmits, or does not transmit, the output signal of the comparator to the signalling means in accordance with the state of a control signal.

Further features and advantages of the invention will be apparent from the ensuing description of several embodiments given by way of example.

BRIEF DESCRIPTION OF THE DRAWINGS

This description will be given with reference to the accompanying drawings in which.

DESCRIPTION OF THE PREFERRED EMBODIMENT

Figure 1:
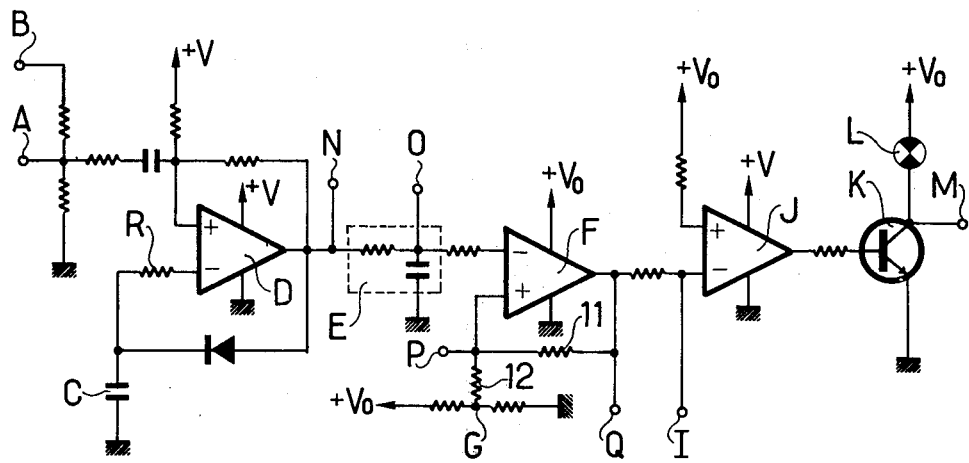
FIG. 1 is an electric diagram of a speed limit passing indicator.

The speed limit passing or exceeding indicator circuit shown in FIG. 1 comprises: a frequency-voltage converter formed by a differential amplifier D connected as a monostable multivibrator and a RC low-pass filter E and a detecting circuit comprising:

a comparator formed by the differential amplifier F of which one of the inputs is connected to the output of the low-pass filter E and the other input is connected to the slider of a display potentiometer G;

a gate circuit formed by a differential amplifier J following on the comparator;

a transistor K connected to the output of the differential amplifier J and employed as a power amplifier; and signalling and control means formed by a light L, a relay, etc.

The monostable multivibrator comprising the differential amplifier D has a control input A having a low level and a control input B having a high level employing an attenuator having a resistance. The low-level input A is, for example, suitable for a tachometric sensor of the magnetic type. The high-level input B is for example suitable for tachometric sensors employing pulses derived from the ignition circuit of the vehicle. The tachometric sensors employed may measure either the speed of the engine or the speed of the wheels of the vehicle.

The differential amplifier D is controlled by currents at its two inputs. Its outputs may assume two states: zero potential, termed the low position, or potential + Vo, termed high position. At rest, it is in the low position. The application of a positive wave leading edge to the inputs A or B passes the output of the amplifier D to the high position for a period of time which is defined by the RC time constant and is preferably chosen to be greater than the times of the parasite signals of a contact and less than the most rapid half-period of the signal from the tachometer. The signal at the output of the monostable multivibrator is a series of positive pulses of the same width. Its frequency, equal to that of the input signal, is a function of the speed of the engine or the speed of the wheels of the vehicle.

The monostable multivibrator D may be inverted by so connecting it that it passes to the high position during its RC time constant: the sole difference is that the output signal at N and O (and the wiring of the rest) becomes increasingly positive (with respect to ground) as the speed of the vehicle or the speed of the engine increases.

The RC low-pass filter E ensures the integration of the series of pulses and furnishes at the output a positive voltage whose amplitude is proportional to the frequency of repetition of the pulses.

At the point N or O (FIG. 1) there may be connected an indicator apparatus (of the moving frame type) corresponding to the indicator of the engine speed (sensor on the coil) or of the speed of the vehicle (tachometric sensor). This voltage, termed the measured voltage, is applied to the input of the detection circuit, that is to say to the negative input of the differential amplifier F. Another voltage, termed the reference voltage, is taken from the slider of a setting potentiometer G and applied to the positive input of the differential amplifier F. This adjustable reference voltage is the image or representation of the speed limit that is set.

So long as the measured voltage is less than the reference voltage, the output of the differential amplifier F is at the potential + Vo, that is to say at the high position. As soon as the measured voltage exceeds the reference voltage, the output of the differential amplifier F passes to potential O, that is to say to the low position. The differential amplifier F connected as a comparator gives a high precision concerning the progression of the signal impressed, but it is sensitive to its amplitude owing to the fact that the reference signal, set by G, varies with the voltage + Vo. On the other hand, the whole of the monostable multivibrator D (whose amplitude varies as + Vo) and the whole of the comparator (whose reference varies also as + Vo) renders the assembly very precise and insensitive to variations in the supply voltage Vo whose effects on the measured voltage and reference voltage compensate for each other.

The resistor 11, connected as a feedback to the differential amplifier F, defines in combination with the resistor 12 interposed between the slider of the celibrating potentiometer and the non-inverting input of the differential amplifier F, the hysteresis of the comparator that is to say the difference between the voltage thresholds for which the output of the comparator passes from the high position to the low position and from the low position to the high position. Indeed, it may be of interest to actuate the signalling for passing a given speed, for example 120 Km per hour, and to stop it only when the speed of the vehicle becomes distinctly lower that this speed, for example lower than 100 Km per hour. If a zero hysteresis is desired, the resistor 11 is purely and simple left out.

The gate circuit is formed by the differential amplifier J which receives at its inverting input the output signal of the comparator and whose non-inverting input is brought to the potential + Vo. The output of this differential amplifier J controls the amplifier transistor K which controls a light L and other signalling or control means, such as relays, acoustic vibrators, speakers etc. connected at M.

The transistor K is blocked and the signalling means stopped when the output of the differential amplifier J is in the low position (zero potential), that is to say when its inverting input is in the high position (potential + Vo). The transistor K conducts and the signalling means are actuated when the output of the amplifier J is in the high position (potential + Vo), that is to say when its inverting input is in the low position (potential O). The differential amplifier J is controlled by the intensity of the current applied to its inverting input which enables it to effect a logic operation AND or a logic operation OR. Indeed, the intensity of the current applied to the inverting input of the differential amplifier J is equal to the sum of the intensities of the output current of the comparator F and the current from the control input I. If either of these two currents can assume an intensity sufficient to bring the inverting input of the differential amplifier J to the high position, the latter operates as a logic AND gate, the actuation of the signalling means requiring the absence of the two currents. On the other hand, if only the total intensity of these two currents is sufficient to bring the inverting input of the of the differential amplifier J to the high position, the latter operates as a logic OR gate, the blocking of the signalling means requiring the presence of the two currents.

The control signal may have various forms, depending on the type of the desired signalling.

Figure 2:
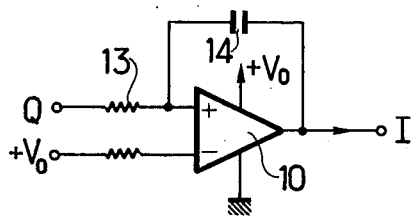
FIG. 2 is a delay circuit adaptable to the speed limit passing indicator shown in FIG. 1.

It could first be desired to introduce a delay in the signalling after the instant of the passing of the speed limit of the vehicle or engine represented by the reference voltage applied to the comparator. It is then sufficient to employ a delay circuit such as that shown in FIG. 2.

This delay circuit is constituted by a differential amplifier 10 which is controlled by currents at its two inputs and is provided with a capacitor 14 connected as a feedback and whose inverting input is brought to a mean potential by means of a polarization current from the source + Vo, whose non-inverting input is connected to the output Q of the comparator through a resistor 13 and whose output is connected to the input I of the control signal.

The output of this delay circuit copies the state of the output Q of the comparator with a delay whose duration is a function of the values of the resistor 13, the capacitor 14 and said mean potential. In the absence of a passing of the speed limit, the signalling means are blocked since the output of the comparator and the input I of the control signal are in the high state (potential + Vo). As soon as the speed limit has been passed, the output of the comparator passes to the low state (potential O). This change in state does not have an immediate effect on the signalling means since the input I of the control signal is maintained in the high state (potential + Vo) by the delay circuit. It is only after the switching of the delay circuit, and if the speed limit continues to be passed, that the output of the gate circuit changes its state and actuates the signalling means.

Figure 3:
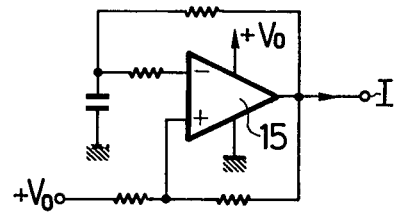
FIGS. 3 and 4 show modulation circuits adaptable to the speed limit passing indicator shown in FIG. 1.

It could also be desired to have a flashing signal so that the warning is more visible. It is then sufficient to apply at I an alternating control signal in the form of pulses furnished, for example, by an estable multivibrator circuit such as that shown in FIG. 3.

This astable multivibrator circuit is constituted in the known manner by a differential amplifier 15 controlled by currents at its two inputs. Its output, at which there is a rectangular voltage, is connected to the input I of the control signal. The differential amplifier J operates as a logic AND gate in the absence of a passing of the speed limit, and the signalling means are blocked since the inverting input of the differential amplifier J constituting the gate circuit is maintained in the high state (potential + Vo) by the output current of the comparator. In the case of a passing of the speed limit, the blocking effect of the comparator disappears, the rectangular voltage applied to the input I of the control signal appears inverted at the output of the differential amplifier J and produces the flashing of the signalling means.

It may also be desired to have a signalling whose intensity varies (after the passing of the speed limit) in accordance with an external control parameter which gives the possibility of providing additional information. Thus, when there is impressed on this input I a signal in the form of a pulse modulation in width, it is easy to make a typical application thereof.

For example, if there may be desired a signal flashing with a rhythm which varies in accordance with the extent to which the speed limit has been exceeded.

Figure 4:
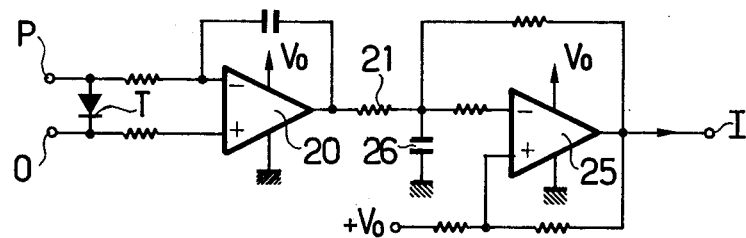

FIG. 4 shows a circuit producing a control signal whereby a signalling of this type can be obtained.

This circuit comprises an integrator controlling the rhythm of the change in an estable multivibrator which produces the control signal. The estable multivibrator is similar to that shown in FIG. 3. It is formed by a differential amplifier 25 in accordance with a known circuit. Its switching rhythm, which defines the cyclic ratio, depends on the charging and discharging times of the capacitor 26. The integrator is formed by a differential amplifier 20 in a circuit which is also known. Its inputs O and P are connected in parallel to the output of the filter. Its output is employed, owing to the resistor 31, as a source of current modifying the charging and discharging currents of the capacitor 26 and consequently the cyclic ratio of the multivibrator. A diode T is shunt connected to the inputs of the integrator. It may also be found by an operational amplifier connected as a diode. It permits the integration of the voltage developed between the points O and P only when the latter is positive, that is to say solely when it corresponds to a passing of the speed limit.

With such a circuit, it is for example possible to choose a reference voltage for the comparator corresponding to a speed limit of 100 Km per hour. The signalling means start to flash as soon as this limit is reached with a cyclic ratio which increases with the speed until the multivibrator is blocked and the signalling means are actuated continuously. The excessive speed at which the multivibrator is blocked may be set, by the choice of the gain and of the integration constant of the integrator, for example at 120 Km per hour.

It may also be desired to avoid the signalling of the passing of the speed limit of short duration which are usually voluntary and due to particular conditions of the traffic, as for example when overtaking. A particular application defines for example excess speed-time integral.

Figure 5:
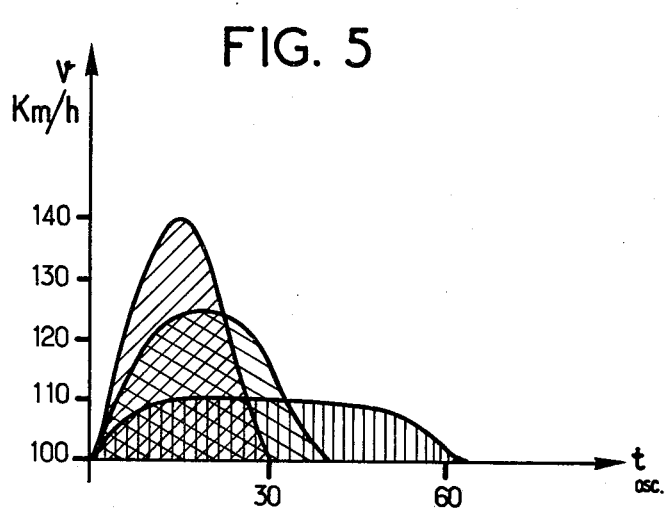
FIG. 5 represents a series of curves explaining various allowable cases of the passing of speed limits.

FIG. 5 shows a series of curves representing the speed as a function of time for different possible cases of a passing of a speed limit of 100 Km per hour due to overtaking. The curves of this series have rather different shapes, but they all define areas of equal size. This is why one of the criteria which may be adopted is the integrated value of the product: the excess beyond the speed limit multiplied by the time during which the speed limit is exceeded, which may be for example chosen to be equal to 10 Km per minute.

Figure 6:
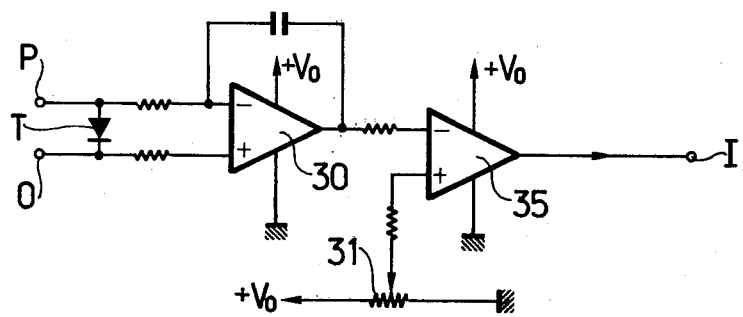
FIG. 6 shows a circuit adaptable to the speed limit indicator shown in FIG. 1 to take into consideration the acceptable cases of the passing of speed limits.

FIG. 6 shows a circuit producing the control signal whereby it is possible to take into account this integrated value.

This circuit comprises an integrator controlling a threshold circuit which produces the control signal. The excess integrator is formed by a differential amplifier 30. Its inputs O and P are, as in the case of the integrator shown in FIG. 4, connected in parallel to the output of the filter. The threshold circuit is formed by a differential amplifier 35 connected as a comparator which receives at its output voltage of the integrator and, secondly, a voltage taken from the slider of a calibrating potentiometer 31 representing the maximum acceptable value of the product of the excess speed beyond the speed limit multiplied by the time during which the speed limit is exceeded. A diode T is shunt connected, as in the preceding circuit, the inputs of the integrator so as to integrate the voltage developed between the points O and P only when it is positive, that is to say solely when it corresponds to a passing of the speed limit represented by the reference voltage applied to the comparator F.

In the case of a passing of the preceding speed limit, the output of the comparator F passes to the low state (potential O). But the signalling means are not actuated since the gate circuit remains blocked owing to the high state (potential + Vo) of the input I of the control signal imposed by the differential amplifier 35. It is only when the output voltage of the integrator 30, representing the value of the product of the excess speed beyond the speed limit multiplied by the time during which the speed limit is exceeded, exceeds the threshold of the comparator 35 that the output of the latter passes to the low state (potential O), unlocks the gate circuits and actuates the signalling means.

The circuit just described with reference to FIG. 6 may of course be combined with that shown in FIG. 4, the integrating circuit being then common thereto, the outputs 1 of the astable multivibrator 25 and the comparator 35 being interconnected through resistors so that only the sum of their output currents applied at I can switch the differential amplifier J. In this way there will be, on one hand, a flashing of the signalling means, as soon as the speed limit is reached, with a cyclic ratio which increases with the value of the integrated signal and, on the other hand, a constant actuation of the signalling means beyond a certain value of the integral as a function of the time during which the speed limit is exceeded.

Figure 7:
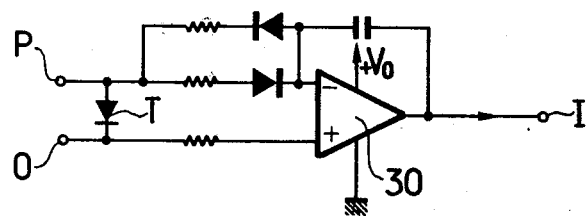
FIG. 7 shows a modification of a part of the circuit shown in FIG. 6.

FIG. 7 shows a modification of the integrator shown in FIG. 6. In this modification the integrator is provided owing to a diode switching circuit, with two integration constants, one for each direction of variation of its input signal. Such an integrator permits for example taking into account the frequency of the excesses of short duration beyond the speed limit, it being possible to render the discharge of the capacitor very slow so that only the exceptional passing of the speed limit of short duration be non-detected by the indicator of the passing of the speed limit.

The speed limit passing indicator whose circuit is shown in FIG. 1 takes into account only a single speed limit. It may be very easily extended to several speed limits. For this purpose it is sufficient to connect to the output of the frequency-voltage converter, in parallel with the detecting circuit, other similar detecting circuits, each comprising a comparator followed by a gate circuit and signalling means. The signalling means associated with the detecting circuits may be separate for example lights of different colors, or common and modulated in different ways by each of the detecting circuits.

One or more of these detecting circuits may also be employed for starting certain operations relating to the driving of a vehicle, such as: the control of an automatic gearbox, the cutting off of the electric supply of the starter beyond a certain speed, the locking of the doors, etc. One or more of the detecting circuits may have the inputs of their comparator inverted so as to furnish an output signal at M an a signalling L when the speed of the vehicle, or the speed of the engine, drops below a certain value.

The speed limit passing indicator just described gives a solution not only to the problems posed by speed limits, but also those posed by driving operations relating to the speed of a vehicle. It may be the basic element of a driving computer for a vehicle. It has the advantage of being simple and it may be constructed with all of its separate components in the form of a cheap integrated circuit. It is, moreover, as shown by the modifications just described, very rapidly adaptable to the various situations arising in the driving of a vehicle.

Moreover, it will be clear that the signal P of the comparator F instead of being fixed or adaptable as described, may be variable in accordance with another external magnitude which is equal or proportional thereto. This concerns the particular case where the input signal coming from the speed of the engine is to be compared with this second signal which is proportional to the speed of the wheels (in a ratio varying with the ratio of the gearbox), in the application to a horn, or a synchronization regulator of a gearbox.

Lastly, a simple branch connection to the speed signal following on the filter E and before comparision at F, enables the same operation to be carried out on the acceleration or deceleration of the vehicle. In particular, a sudden and high acceleration or deceleration permits a detection (and display) of skidding of the tires (a useful function for antiskid braking for "education" purposes) or a sudden stoppage corresponding to an accident (with an automatic actuation of a warning etc.).

What is claimed is:

1. A speed limit passing indicating device for an automobile comprising:
    means for furnishing electric pulses at a frequency proportional to the speed of the vehicle;
    a frequency-voltage converter comprising a monostable multivibrator coupled to an RC low-pass filter, the monostable multivibrator having an input, said input coupled to said means for furnishing pulses;
    at least one detection circuit coupled to said RC low-pass filter, said detection circuit including a comparator;
    means for furnishing a reference voltage indicative of a speed limit to said comparator, whereby said comparator receives the output of said converter and said reference voltage;
    a gate circuit coupled to said detection circuit;
    means for supplying a control signal to said gate circuit, said control signal determining whether said gate circuit will transmit the output of said comparator; and
    signaling means controlled by said gate circuit.

2. A device as claimed in claim 1, wherein the detecting circuit comprises a delay circuit connected to the output of the comparator and producing the control signal.

3. A device as claimed in claim 1, wherein the detecting circuit comprises an astable multivibrator producing the control signal.

4. A device as claimed in claim 1, wherein the detecting circuit comprises an integrating circuit whose input is connected in parallel to the inputs of the comparator and is followed by a threshold circuit which produces the control signal.

5. A device as claimed in claim 1, wherein the detecting circuit comprises an integrating circuit whose output is connected in parallel with the inputs of the comparator and is followed by an astable multivibrator which produces the control signal and whose cyclic ratio is a function of the output voltage of the integrating circuit.

6. A device as claimed in claim 4, wherein said integrating circuit is provided, owing to a diode switching, with two integrating constants, one for each direction of variation of its input signal.

7. A device as claimed in claim 1, wherein said comparator is provided with a feedback circuit giving the comparator hysteresis.

8. A device as claimed in claim 1, wherein the detecting circuit is supplied by a source of voltage + Vo whose variations have the same effects on the output signal of the frequency-voltage converter and on said reference voltage so that these effects compensate for each other at the input of the comparator.

9. A device as claimed in claim 4, wherein a diode is shunt connected with the inputs of the integrator so that the output signal of the integrator is an image of the integral as a function of time, of the speed exceeding the speed limit.

10. A device as claimed in claim 5, wherein a diode is shunt connected with the inputs of the integrator so that the output signal of the integrator is the image of the accumulation in the integral as a function of the time of the speed in excess of the speed limit.

11. A device as claimed in claim 13, wherein said threshold circuit produces a control signal actuating alarm means when is threshold, which corresponds to a given value of the integral as a function of the time of passing the speed limit, has been passed through.

12. A device as claimed in claim 1, comprising a voltage integrator connected to the output of means converting pulses into a direct voltage for indicating the speed of the engine of the vehicle.

13. A device as claimed in claim 1, further comprising a branch connection connected between means for converting pulses into voltage and comparision means.

* * * * *